United States Patent [19]

Maston

[11] 3,755,625

[45] Aug. 28, 1973

[54] MULTIMICROPHONE LOUDSPEAKING TELEPHONE SYSTEM

[75] Inventor: Donald James Maston, West Lafayette, Ind.

[73] Assignee: Bell Telephone Laboratories, Incorporated, Berkeley Heights, N.J.

[22] Filed: Oct. 12, 1971

[21] Appl. No.: 188,119

[52] U.S. Cl. .............................................. 179/1 CN
[51] Int. Cl. .............................................. H04m 3/56
[58] Field of Search ............ 179/1 CN, 1 VC, 1 HF; 340/148

[56] References Cited

UNITED STATES PATENTS

| | | | |
|---|---|---|---|
| 3,524,929 | 8/1970 | Burns et al. | 179/1 CN |
| 3,555,190 | 1/1971 | Braun | 179/1 CN |
| 3,437,758 | 4/1969 | Clement | 179/1 CN |

*Primary Examiner*—Kathleen H. Claffy
*Assistant Examiner*—Douglas W. Olms
*Attorney*—W. L. Keefauver et al.

[57] ABSTRACT

A modified speakerphone conference system with a plurality of microphones employs a comparator in combination with logic circuitry that selects the microphone with the greatest output and connects it to the speakerphone input while simultaneously disconnecting the others. In the absence of other inputs, a microphone that has control retains control despite pauses. Control can be seized, however, by any microphone with an overriding signal. Switching and the transmission of background noise are both minimized.

8 Claims, 8 Drawing Figures

MULTIMICROPHONE LOUDSPEAKING TELEPHONE SYSTEM

BACKGROUND OF THE INVENTION

1. Field of the Invention

This invention relates to loudspeaking telephones and more particularly to conference telephone systems.

2. Description of the Prior Art

Loudspeaking telephones, commonly called speakerphones, are well known in the art as shown, for example, in U.S. Pat. No. 3,046,354, issued to W. F. Clemency July 24, 1962. Telephones of this type normally employ automatic volume or gain adjustment in the transmitting and receiving channels responsive to the presence or absence of speech energy in one of the channels. Such an arrangement is often referred to as a voice-switched control system.

Speakerphones are particularly useful to a customer who wishes to enjoy the freedom and flexibility of so-called hands-free telephony. Without the impediment of a conventional handset, the customer is able to write or consult reference material or even walk about the room in the course of the telephone conversation. To a much more limited degree, speakerphones are also useful in conducting a telephone conference in which a number of conferees at one station can share the use of a single transmitter or microphone and, in a normal size room, all can readily hear received speech by way of a single loudspeaker. A major problem is encountered, however, when using a conventional speakerphone for a conference call, since, as the number of people in the conference increases, the quality of the transmission decreases. This diminution of transmission quality stems from the fact that in larger groups, individual conferees are generally further from the microphone than in smaller groups. The result is a decrease in transmitted voice level and an increase in reverberation.

In an effort to overcome the difficulties noted, attempts have been made in the prior art to employ a speakerphone arrangement with a plurality of microphones. One known system of that type requires manual selection of any single one of the microphones as the live channel. Accordingly, the individual who has the manual switching responsibility must always be alert to determine which one of the conferees is talking and to select the appropriate microphone or otherwise the advantage of the system is lost. In any event, it is evident this system is less than ideal from the standpoint of ease of operation and convenience.

Another prior art arrangement for achieving multimicrophone speakerphone service utilizes a speakerphone in combination with as many microphones as are needed, all operating simultaneously. The drop in signal level that results from the loading effect that each microphone has on the others is compensated for by using an amplifier between each of the microphones and the speakerphone proper. This system offers two important advantages in that it places microphones close to all conferees and, additionally, it avoids the loss of information that might otherwise occur from poorly timed switching. This system has an overriding disadvantage, however, since each microphone added results in more ambient noise in the transmision. Such noise may be analyzed quantitatively by assuming that noise levels present at each microphone are uncorrelated. It can be readily shown, for example, that for four microphones operating simultaneously, approximately 6.0 db more noise is transmitted as compared to having only one microphone in use. It is thus evident that the relative noise level transmitted to the line in an all-live multimicrophone system is unacceptable, particularly when four or more microphones are employed.

SUMMARY OF THE INVENTION

The foregoing problems and additional problems are solved in accordance with the principles of the invention by a multimicrophone speakerphone system that employs an automatic voice-operated switching arrangement that selects the microphone with the greatest input and connnects it to the speakerphone while, simultaneously, effectively disconnecting the other or nonselected microphones. In the absence of other talking, the microphone which last had control retains control, and unnecessary switching is thereby avoided. In accordance with one feature of the invention, any nonselected microphone has the capability of seizing control from a previously selected microphone by introducing a signal that exceeds that from selected microphones by some preselected level such as 3.0 db for example.

Other features of the invention relate to specific circuit combinations that are employed to implement the functions indicated. For example, a latching circuit employing a FET as an adjustable resistor in a voltage divider network is used to insert loss into the control circuit of a channel when the channel does not have control.

DETAILED DESCRIPTION

Figure 1:
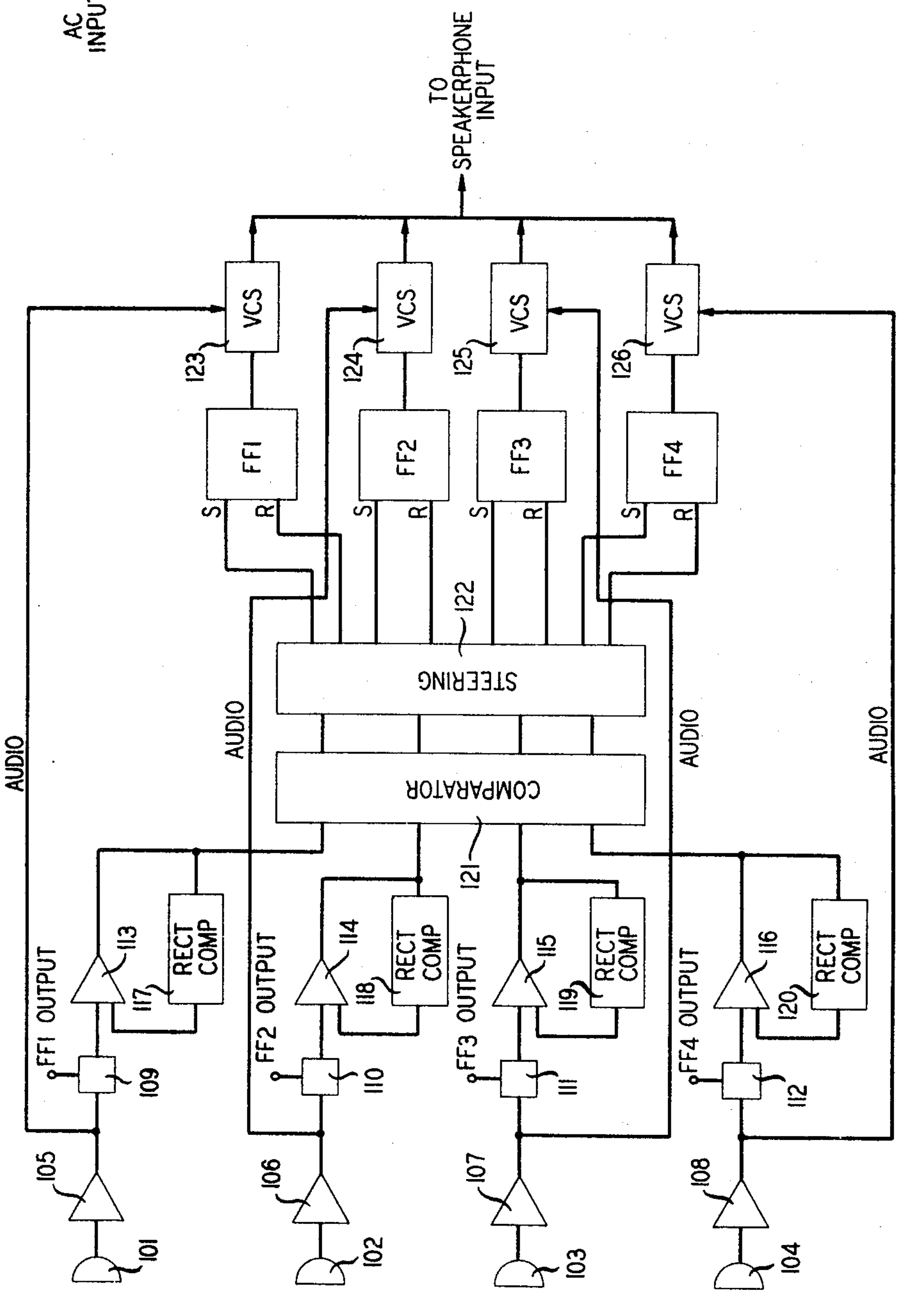
FIG. 1 is a block diagram of a multimicrophone speakerphone system in accordance with the invention.

As shown in FIG. 1, a conference system in accordance with the invention employs a plurality of microphones 101 through 104, each in combination with a respective preamplifier 105 through 108. Each preamplifier output is applied to a respective one of the latching circuits 109 through 112 each of which, as indicated, also has an input from a respective one of the flip-flop outputs FF1 through FF4. Each of the latching circuits 109 through 112 feeds into the combination of a respective one of the amplifiers 113 through 116 and a respective one of the rectifier range compressors 117 through 120. An output from each of the combinations indicated is then applied to a comparator circuit 121 and thence to a steering network 122 which, in turn, is arranged to drive each of four flip-flops FF1 through FF4. The output from each of the flip-flops is fed as a control signal to a respective one of four voltage controlled switches 123 through 126. A power supply which is also required is not shown.

In greater detail, the audio signal resulting from acoustic power being applied to the microphones 101 through 104, as amplified by the preamplifiers 105 thorugh 108, has a range on the order of −55 dbv to −15 dbv and is rectified and compressed into a range of approximately 0.5 volts d.c. to 3.7 volts d.c. The range compression indicated is achieved by varying the gain of the rectifier-operational amplifiers 113 through 116 with input level, starting with maximum gain at the minimum input levels and ending at minimum gain at the largest input levels. As a result, the system is allowed to operate with weak and loud inputs. The function of the comparator 121 is to determine which of the four inputs is the largest. Each of the four outputs from the comparator 121 is in the form of a logic signal which is "high" when its input is largest and "low" when any other input is greater.

The purpose of the steering network 122 is to direct logic high levels to the set terminal of the corresponding flip-flop and simultaneously to the reset terminals of the other three flip-flops. This arrangement allows only one flip-flop output to be logic high at any one time depending upon which comparator output is also high. A casual inspection may lead one to conclude that the use of the flip-flops FF1 through FF4 following the comparator 121 is redundant and therefore unnecessary inasmuch as both outputs indicate essentially the same condition. In accordance with the invention, however, the flip-flops FF1 through FF4 are used additionally to remember which of the microphones 101 through 104 last had control so that unnecessary switching is avoided. Thus, in the absence of other talking, a microphone user who pauses while he is talking is able to retain control throughout the pause, and unneeded switching sounds are kept out of the transmission.

The logic outputs of each of the flip-flops FF1 through FF4 control two functions, namely, the latching circuits 109 through 112 and the voltage controlled switches (VCSs) 123 through 126. The purpose of the voltage controlled switches is to block or to pass the audio input to the speakerphone depending on whether the corresponding flip-flop outputs are high or low. A logic high flip-flop output allows the VCS to pass its audio to the speakerphone input, while logic low flip-flop output directs the VCS to block its audio from transmission.

The latching circuits 109 through 112 which, as indicated above, are controlled by the flip-flop outputs, give the controlling one of the microphones 101 through 104 an approximate 3.0 db control voltage level advantage over the other microphones. The purpose of this latching is to prevent indecision by the comparator when two or more nearly equal inputs are present which can occur when a talker is sitting equidistant from two or more microphones. After the comparator 121 first decides that one of the four possible input levels is greater than the others, this "winning" control level is unaltered by the latching circuit, while the level in each of the "losing" channels is reduced by approximately 3.0 db. In accordance with the invention, this action provides for positive control by only one input when it is nearly equal to other inputs.

As a result of the combination of the individual actions described above, a system in accordance with the invention selects the microphone which has the greatest input and connects it to the speakerphone input while, in effect, simultaneously disconnecting the other three. In the absence of other talking, the microphone which last had control retains control, and unnecessary switching is thereby reduced or eliminated. In order for any of the three other microphones to capture control from the controlling microphone, the challenging input level must exceed the controlling input level by at least 3.0 db.

MICROPHONE-PREAMPLIFIER

The characteristics required for the microphone-preamplifier combination shown in FIG. 1 can readily be met by conventional units. It is desirable, however, for the output of each preamplifier to be on the order of −35 dbv for average loudness talking and, additionally, the output should vary over a range of approximately −35 ±20 dbv for very soft and very loud talking. If noise is a problem, and the lead between the microphone and the preamplifier is unduly long, consideration of the impedance level into the line from the microphone may be required. The only further requirement is that the microphone-preamplifier combinations should be selected for good frequency response.

LATCHING CIRCUIT

Figure 2:
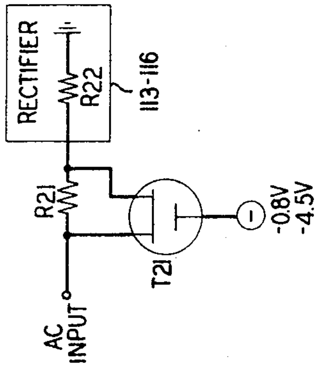
FIG. 2 is a schematic circuit diagram of one of the latching circuits of FIG. 1.

Each of the latching circuits 109 thorugh 112 has the purpose of inserting a preselected amount of loss such as 3.0 db, for example, into the control circuit of a channel whenever that channel does not have control. As shown in FIG. 2, a latching circuit in accordance with the invention employs a junction FET T21 as an adjustable resistor in a voltage divider network. The source to drain conductance of FET T21 is a parallel with a resistor R21 which may be on the order of 620 ohms, and the combination of the two is in series with the incoming audio control signal. This series resistance along with the approximately 1.0K ohm input resistance R22 of the rectifier-operational amplifier forms a voltage divider network which can be adjusted to give different values of loss by changing the value of reverse bias on the FET. One FET found to be suitable had the following characteristics:

$$Rds \approx 200\Omega \text{ at } Vgs = -1.0\ vdc$$

$$Vp \approx -4\ vdc \text{ at } VDs = 0\ .$$

This transistor lends itself well to the application indicated inasmuch as the bias voltages available from the outputs of the flip-flops FF1 through FF4 are typically on the order of −0.8 volts d.c. and −4.5 volts d.c. When the bias voltage is −4.5 volts d.c., the series resistance of the resistor-transistor combination is essentially that of the resistor itself, namely, 620 ohms. Thus, the loss $L_1$ is:

$$L_1 \approx 20 \log_{10} ([1+.62]/[1]) \approx 4.2 \text{ db}\ . \tag{1}$$

When the bias voltage is −0.8 volts d.c., the series resistance Rs of the resistor R21 in the transistor T21 combination is approximately:

$$Rs \approx 200\Omega\ ||\ 620\Omega \approx 150\Omega \tag{2}$$

The loss $L_2$ for this case is:

$$L_2 \approx 20 \log_{10} [1+.15]/[1] \approx 1.2 \text{ db.} \quad (3)$$

Thus, the total loss $L_T$ switched is:

$$L_T = L_1 - L_2 \approx 3 \text{ db.} \quad (4)$$

RECTIFIER-RANGE COMPRESSOR

Each of the rectifier-range compressor circuits 117 through 120 simultaneously performs the two functions implied:

1. It rectifies the input a.c. signal; and 2. It compresses the range of the input signal from $$2mv \leq Vin \leq 200mv \text{ rms} \quad (5)$$

to an output range of $$0.5V \leq Vout \leq 3.7 \text{ vdc} \quad (6)$$

Thus, the 100:1 input range is linearly compressed to the 7.5:1 output range.

Figure 3:
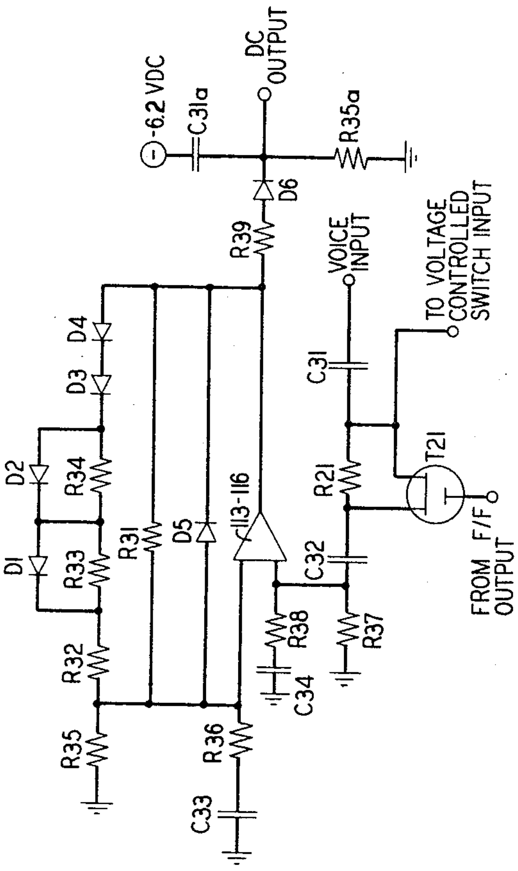
FIG. 3 is a schematic circuit diagram of one of the rectifier-range compressor circuits of FIG. 1.

As indicated above, the primary purpose of the rectifier-range compressor amplifier combinations is to amplify small signals with large gain and large signals with small gain, so that the comparator 121 which follows can be more equally sensitive to both large and small signals. This function is accomplished in part by employing a nonlinear circuit for the feedback path of each of the operational amplifiers 113 through 116. AS shown in FIG. 3, each of the operational amplifiers 113 through 116 is used in its noninverting mode so that on the negative swings of the input signal, the feedback path is essentially reduced to a resistor R31 in parallel with a diode D5. In this case, the magnitude of the negative output cannot rise to a voltage greater than the forward voltage drop of a single diode which is approximately 1.7 volts.

For the positive swings of the input signal, however, the feedback path reduces to resistor R31 in parallel with the combination of diodes D1 through D4 and the resistors R32, R33 and R34. With very small positive inputs, the series resistance of the diodes D3 and D4 is much greater than that of resistor R31, which may be on the order of 330K ohms, and thus the feedback element has a resistive value of approximately that magnitude. As the positive input level increases, the series resistance of the diodes D3 and D4 starts to decrease due to the increased current through them. The resistance of diodes D1 and D2 is still much higher than the resistors R33 and R34 in parallel with them, so that the feedback resistance approaches the parallel combination of resistor R31 and resistors R32, R33 and R34.

Figure 4:
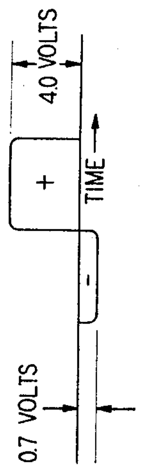
FIG. 4 is a plot of the output characteristics of one of the rectifier-operational amplifiers of FIG. 1.

Further increase in the positive input level results in the resistances of diodes D2 and D1 approaching sequentially the values of resistors R33 and R34 which shunt them. Ultimately, the total resistance of the feedback path approaches the magnitude of resistor R32 for large positive input levels. Thus the total feedback resistance is reduced with increasing signals, the operational amplifier gain being lower for larger outputs. For maximum input which may be on the order of 200 mv rms, the voltage at the output of the operational amplifiers 113 through 116 is as shown in FIG. 4. This output can be filtered directly to achieve relatively smooth d.c. but the efficiency of rectification is not as high as it could be if the negative portion of the output were not present. This portion can be removed, however, by the connection of diode D6 in series with the operational amplifier output as shown. The result is a significant increase in efficiency.

The addition of diode D6 results in an added benefit in that it effectively prevents the filter capacitor C31 from discharging through the output of the operational amplifier and thus allows capacitor C31 to discharge slowly through resistor R35 which is connected in parallel therewith. This arrangement is desirable so that transient room noise will have less chance of switching the comparator 121 during normal pauses in conversation.

To ensure that the four rectifiers 117 through 120 track with each other and give equal outputs for identical inputs, it is desirable to use matched diodes in the feedback loops of the operational amplifiers 113 through 116. For this purpose, diode arrays in integrated circuit form have been found to be effective. With such an arrangement, the diodes of each array are distributed in the same relative positions in all four of the feedback loops. For example, all diodes corresponding to diode D1 come from the same array, and all diodes corresponding to diode D2 come from another common array, and so on. Thus, the inherent matching of diodes processed on the same integrated circuit is used to its fullest advantage. Completing the rectifierrange compressor circuit of FIG. 3 are coupling capacitors C31, C32, C33, and C34, input resistors R35, R36, R37 and R38 and an output resistor R39.

COMPARATOR CIRCUIT

Figure 5:
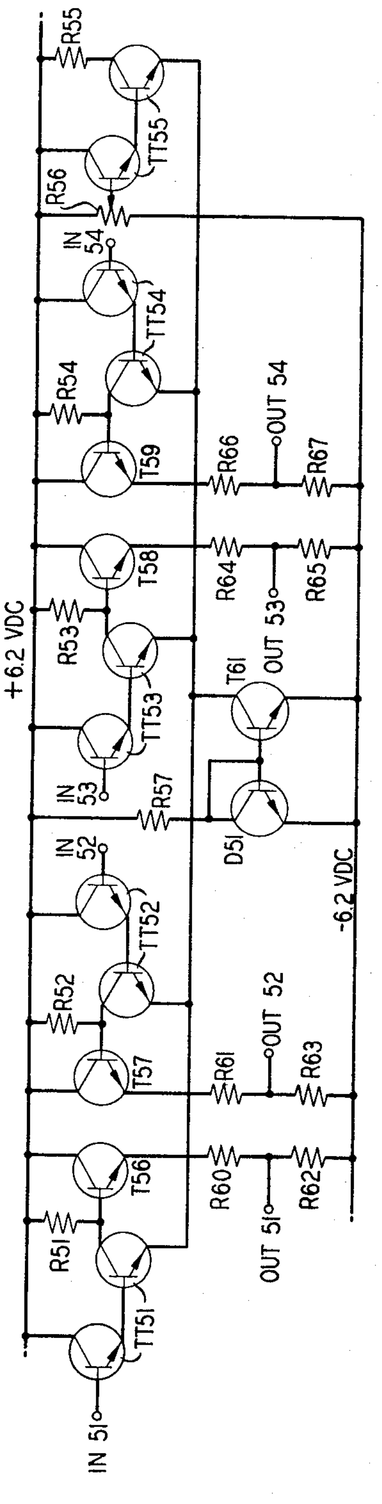
FIG. 5 is a schematic circuit diagram of the comparator of FIG. 1.

The four-input comparator shown in detail in FIG. 5 employs five Darlington pairs TT51 through TT55, all of which work into a common current sink, a common emitter transistor T61, which is biased through a resistor R57 and a transistor D51 connected as a diode in the base circuit of transistor T61. Darlington inputs are desirable because of the high input impedance they provide which ensures against excessively loading the preceding rectifier circuits.

Each of the four-input Darlington pairs TT51 through TT54 drives a respective common collector output stage, transistors T56 through T59. The emitter resistances of these output stages are voltage dividers employing resistors R60 through R67 with resistance magnitudes chosen to give suitable output voltages for triggering flip-flops FF1 through FF4 which follow. Load and bias functions are performed by resistors R51 through R55. The fifth Darlington pair TT55 on the current sink takes control whenever conversation stops. Its input is biased at a d.c. level which is adjusted by the variable resistor R56 to be slightly greater than the d.c. level produced by the rectifiers when no conversation is occurring. This arrangement prevents unnecessary switching of the comparator 121 during these conversation lulls.

STEERING NETWORK

Figure 6:
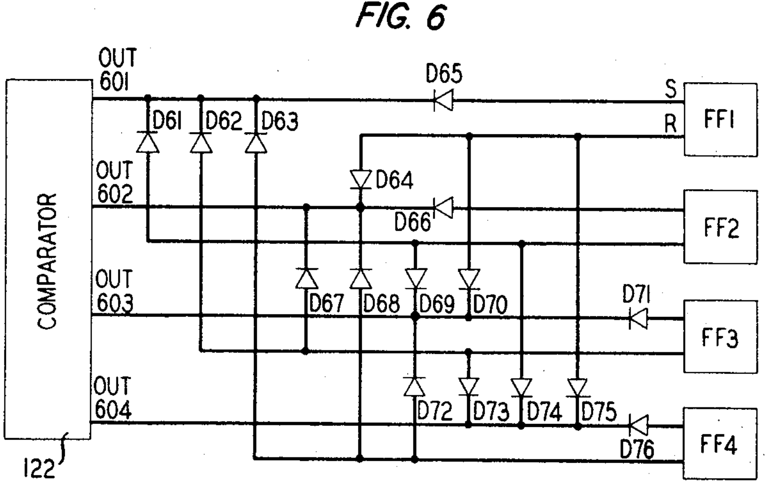
FIG. 6 is a schematic circuit diagram of the steering circuit of FIG. 1.

The steering network 122 of FIG. 1 which is shown in detail in FIG. 6 employs diode logic utilizing diodes D61 through D76 to steer output comparator levels to the proper inputs of the flip-flops FF1 through FF4. The diodes D61 through D76 provide a series of one-way paths between the comparator 122 and the flip-flops. For example, if the comparator output 601 is "high" in a logic sense, this level is transmitted to the set (S) terminal of flip-flop FF1 and also to the reset (R) terminal of flip-flops FF2, FF3 and FF4. This action makes the output of flip-flop FF1 logic high and the outputs of the flip-flops FF2, FF3 and FF4 logic low which is the correct response. It should be noted that if the steering circuit diodes were not present, levels transmitted to any flip-flop reset terminal would also reach the set terminals of the other three flip-flops. This condition would result in the indeterminate situation of having logic high levels present at both set and reset inputs of the flip-flops.

BISTABLE FLIP-FLOPS

Figure 7:
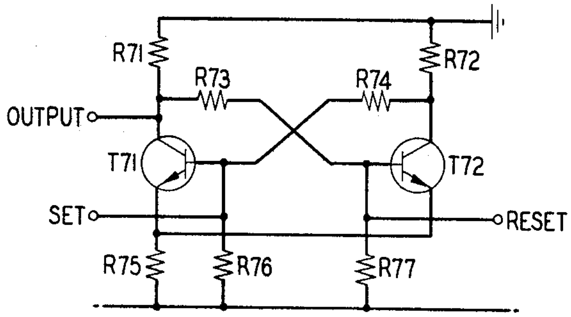
FIG. 7 is a schematic circuit diagram of one of the flip-flops of FIG. 1.

As shown in FIG. 7, the circuit arrangement for each of the flip-flops FF1 through FF4 is substantially conventional. Each flip-flop employs a conventional base-collector, cross-connected pair of transistors T71–T72 in combination with bias and load resistors R71 through R77. Set and reset triggers are applied to the bases of transistors T71 and T72, and the output is taken from the collector of the "set" transistor. The output levels are selected so that the field-effect transistors (FETs) of the voltage control switches 123 through 126 (described below), which are controlled by the flip-flops, are switched between pinch-off and as far "on" as possible. In this case, the flip-flop output switches between –0.85 volts and –4.50 volts.

VOLTAGE CONTROLLED SWITCHES

Figure 8:
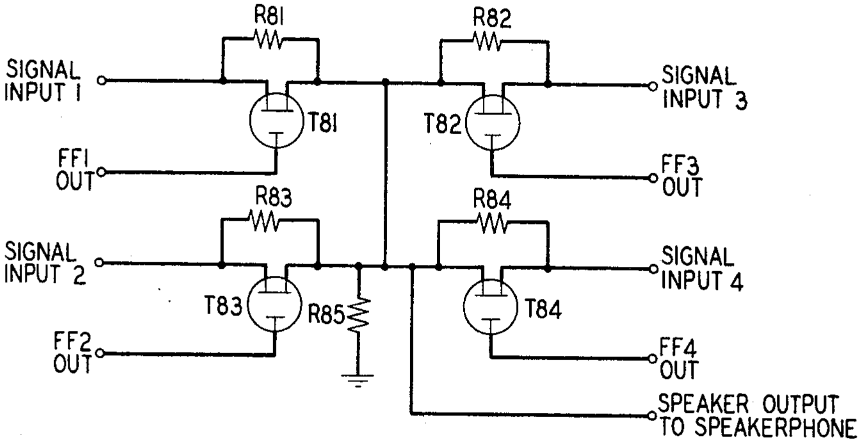
FIG. 8 is a schematic circuit diagram of one of the voltage controlled switches of FIG. 1.

As shown in FIG. 8, in the voltage controlled switches 123 through 126, junction FETs T81 through T84 are used as switches either to pass or to block an audio signal from the line. Each of these FET switches or gates T81 through T84 is biased by a corresponding one of the flip-flop outputs through a resistor R85 which is connected to ground. When a gate has a –0.85 volt potential applied to it, the source to drain resistance of the transistor is approximately 200 ohms. This condition makes the resistance of the appropriate one of the parallel combinations of resistors R81 through R84 and FETs T81 through T84 approximately 200 ohms also. The input impedance of the speakerphone is typically on the order of 10K ohms and, accordingly, the switch presents almost no loss to the audio signal. When one of the gates has –4.5 volts applied to it, the FET is cut off and the drain to source resistance is much larger than the 22K ohm resistor connected from drain to source. This condition results in 22K ohms in series with the audio signal input which presents a loss of $20 \log_{10} ([22+10]/[10])$ or approximately 10 db. Each of the resistors R81 through R84 has a magnitude of about 22K ohms in order to ensure this 10 db minimum loss when in the "loss" mode. This value represents a compromise between two conflicting considerations. First, it is desirable to switch as little loss as possible to achieve minimum disturbance during switching; and second, it is desirable to have a relatively high swith loss inasmuch as the transmitted quiescent noise level increases as switched loss decreases. The 10 db value of loss represents a compromise value which simultaneously minimizes both switched loss and transmitted noise level.

It is to be understood that the embodiment described herein is merely illustrative of the principles of the invention. Various modifications thereto may be effected by persons skilled in the art without departing from the spirit and scope of the invention.

What is claimed is:

1. In a conference telephone system, in combination,
- a loudspeaking telephone including an input point,
- a plurality of microphones,
- means automatically operative in response to signal outputs from said microphones for selecting that one of said outputs having the greatest magnitude,
- means for applying the selected one of said outputs to said input point,
- means for blocking signals from nonselected ones of said microphones from application to said input point,
- and means responsive to any nonselected one of said outputs that exceeds the selected one of said outputs by an adjustable level for enabling said last named nonselected output to seize control and to be applied to said input point in lieu of an earlier selected one of said outputs.

2. Apparatus in accordance with claim 1 wherein said selecting means comprises a comparator
- and means including a plurality of combination rectifier-range compressor circuits each connected between one of said microphones and a respective input to said comparator.

3. Apparatus in accordance with claim 2 wherein said blocking means includes a plurality of flip-flops and a plurality of voltage controlled switches,
- each of said switches being connected in series relation between the output of a respective one of said microphones and said input point of said loudspeaking telephone,
- and means for applying a control signal from an output of each of said flip-flops to a corresponding one of said voltage controlled switches.

4. Apparatus in accordance with claim 3 further including a plurality of latching circuits each connected between the output of a respective one of said microphones and the input of a respective one of said rectifier-range compressor circuits, said latching circuit enabling said selected output to retain control and continue to be applied to said input point until one of said nonselected outputs exceeds said selected output by said adjustable level.

5. Apparatus in accordance with claim 4 including means for applying a control signal from each of said flip-flops to a respective one of said latching circuits,
- each of said latching circuits comprising means responsive to a respective one of said last named control signals for inserting loss in the path between a respective one of said microphones and a corresponding one of said rectifier-range compressor circuits whenever said last named microphone is nonselected.

6. Apparatus in accordance with claim 2 wherein each of said combination rectifier-range compressor circuits comprises an operational amplifier having a nonlinear circuit in its feedback path, said operational amplifier being operated in a noninverting mode.

7. Apparatus in accordance with claim 3 including a steering network connected between the outputs of said comparator and the inputs of said flip-flops, said steering network comprising logic circuitry responsive to a signal of a preselected level from said comparator for directing said last named signal to one input lead of one of said flip-flops and to the opposite input lead of all others of said flip-flops.

8. A loudspeaking telephone system comprising, in combination, a plurality of input transducers, a single output point, a respective control channel connected between each of said transducers and said output point, said control channels including means responsive to a signal from one or more of said transducers for applying that one of said signals having the greatest magnitude to said output point and further including means for subsequently applying another one of said signals having a magnitude that exceeds the previously applied signal by an adjustable level to said output point in lieu of said previously applied signal.

* * * * *